United States Patent [19]

Hsu et al.

[11] 3,930,243

[45] Dec. 30, 1975

[54] METHOD AND APPARATUS FOR STABILIZING A BUBBLE DOMAIN SYSTEM

[75] Inventors: Ta-Lin Hsu; Hung Liang Hu, both of San Jose, Calif.

[73] Assignee: International Business Machines Corporation, Armonk, N.Y.

[22] Filed: Oct. 25, 1974

[21] Appl. No.: 518,026

[52] U.S. Cl. .......... 340/174 TF
[51] Int. Cl.$^2$ .......... G11C 11/14
[58] Field of Search .......... 340/174 TF

[56] References Cited

OTHER PUBLICATIONS

IBM Technical Disclosure Bulletin – Vol. 17, No. 5, Oct. 1974, p. 1485.

*Primary Examiner*—James W. Moffitt
*Attorney, Agent, or Firm*—Joseph E. Kieninger

[57] ABSTRACT

A method and apparatus for stabilizing a bubble domain system containing bubble domains having no Bloch lines and bubble domains having a pair of Bloch lines is described. The method consists of continuously applying an in-plane magnetic field, for example 25 oersteds, to a magnetic layer which is exchange coupled to the medium containing the bubble domains. The magnitude of the magnetic field that is applied is greater than zero oersteds and less than that required to obtain a bubble domain having a pair of Bloch lines therein.

9 Claims, 4 Drawing Figures

METHOD AND APPARATUS FOR STABILIZING A BUBBLE DOMAIN SYSTEM

BACKGROUND OF THE INVENTION

1. Field of the Invention

This invention relates to bubble domains and more particularly to a method and apparatus for stabilizing a bubble domain system having bubbles with different wall states therein.

2. Description of the Prior Art

The controlled generation of wall-encoded magnetic bubble domains is described in co-pending U.S. Pat. application Ser. No. 492,565 now abandoned assigned to the assignee of the present invention. This patent application is incorporated herewith by reference thereto. A bubble domain having one pair of Bloch lines, that is, a state S = 0, can be generated by momentarily applying an external in-plane field to a magnetic layer which is exchange coupled to the medium in which the bubble domain is formed. A bubble domain having no pair of Bloch lines, that is a state S = 1, can be generated in a medium which is exchange coupled to a magnetic layer when there is no external in-plane field being applied to the magnetic layer.

The aforementioned patent application also describes a method for switching the states of a bubble domain to either S = 0 or S = 1. Switching or converting the state of a bubble domain to S = 0 is accomplished by moving the bubble domain to a section of the medium which has a magnetic layer exchange coupled thereto. The magnetic layer has an external in-plane magnetic field applied thereto. Then the bubble domain is subjected to a magnetic field which causes rapid motion in the walls of the bubble domain whereby a bubble domain having an S = 0 state is formed.

Switching or converting the state of a bubble domain to S = 1 is accomplished by moving the bubble domain to a section of the medium which has a magnetic layer exchange coupled thereto. The magnetic layer does not have an external in-plane magnetic field applied thereto. Then the bubble domain is subjected to a magnetic field which causes rapid motion in the walls of the bubble domain whereby a bubble domain having an S = 1 state is formed.

The ability to generate bubble domains having a state of either S = 0 or S = 1 and the ability to switch the state of a bubble domain to either S = 0 and S = 1 are very valuable tools, especially in the operation of a bubble domain lattice. A problem exists, however, as to the stability of the individual bubble domains in a lattice containing bubble domains with an S = 0 state as well as bubble domains with an S = 1 state. This problem becomes particularly severe when the bubble domains are translated or propagated into, out of or within the lattice since the state of a bubble domain can readily be changed depending on the lattice environment when the bubble domain walls are subjected to motion. For example, an environment which is suitable for the generation of a bubble domain having an S = 0 state will also convert a bubble domain having an S = 1 state to the state of S = 0 when the bubble domain is moved. Similarly, an environment which is suitable for the generation of a bubble domain having an S = 1 state will convert bubble domains having an S = 0 state to the state of S = 1 when the bubble domain is moved.

SUMMARY OF THE INVENTION

It is a primary object of this invention to provide a method of stabilizing bubble domains.

It is another object of this invention to provide a method of stabilizing bubble domains having an S = 0 state in the presence of bubbles having an S = 1 state.

It is another object of this invention to provide a method of stabilizing bubble domains having an S = 1 state in the presence of bubbles having an S = 0 state.

It is yet another object of this invention to provide a method of stabilizing a bubble domain lattice containing bubble domains with an S = 0 state and bubble domains having an S = 1 state.

It is still another object of this invention to provide an apparatus for stabilizing bubble domains.

These and other objects of this invention are accomplished by a method in which an in-plane magnetic field is continuously applied to a magnetic layer which is coupled to the bubble domain medium. The strength of the magnetic field is greater than zero oersteds and less than that required to obtain a bubble domain having an S = 0 state when the wall of said bubble domain is moved with a velocity sufficient to cause magnetic orientation instability therein. An example is the continuous applying of an in-plane magnetic field of 25 oersteds to a magnetic layer which is exchange coupled to a film of yittrium europium gallium garnet. In this example, a condition exists in which bubble domains having an S = 0 state are stabilized and bubbles having S = 1 state are stable.

Other objects of this invention will be apparent from the following detailed description wherein a preferred embodiment of the present invention is clearly shown.

DETAILED DESCRIPTION OF THE INVENTION

Figure 1A:
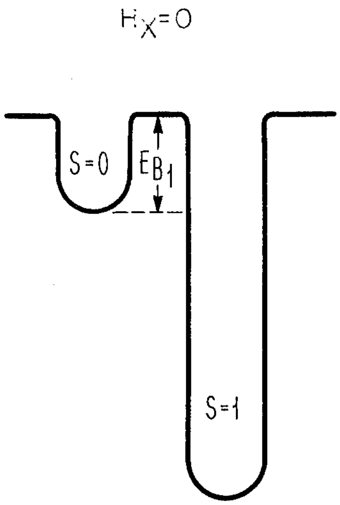
FIGS. 1A–1D represent various energy barriers between S = 0 state and S = 1 state at different in-plane magnetic field strengths.

This invention involves a method and apparatus for stabilizing a bubble domain system, for example a bubble domain lattice, which contains bubble domains having an S = 0 state and bubble domains having an S = 1 state. This method involves applying an in-plane magnetic field to a magnetic layer which is exchange coupled to the bubble domain medium. As a practical matter, the in-plane field is applied to the bubble medium as well as the exchange coupled magnetic layer and this in fact may play a role in the stabilizing mechanism. This method requires a magnetic layer which is exchange coupled to the bubble domain medium. In bubble domain systems which do not have such a layer, the first step in this method is to provide such a layer. The exchange coupled magnetic layer can be a garnet layer, an ion-implanted layer or a thin nickel-iron layer and is formed by conventional techniques. The in-plane magnetic field can be generated by using an external coil, a permanent magnet or by any other suitable manner known in the art.

The magnitude of the in-plane magnetic field is of the utmost importance in the practice of this invention. The range of the magnitude is from a value greater than zero oersteds to a value less than that required to obtain a bubble domain having a pair of Bloch lines when the wall of the bubble domain is moved with a velocity sufficient to cause magnetic orientation instability therein. It is believed, but this invention is not limited to this theory, that the optimum magnitude is that sufficient to provide the maximum energy barrier betwen the bubble domain wall state having no Bloch lines, that is S = 1, and the wall state having a pair of Bloch lines, that is S = 0. This invention is operative over a range extending from one side of the optimum value to the other side. It should be recognized that due to other considerations concerning the bubble domain systems, such as optimizing the detection means, a magnitude within the range set forth above other than the optimum value may be used.

The magnitude of the in-plane magnetic field required to achieve an energy barrier sufficient for stabilization purposes of the bubble domain system is dependent upon the saturation magnetization value of the bubble domain medium. The magnitude is 5 to 25% of the saturation magnetization value. The size of the bubble domain also affects the magnitude required. For example, the magnitude required for a 5 micron bubble domain system is different from that for a 1 micron bubble domain system. A preferred magnitude range of the in-plane magnetic field is 15 to 40 oersteds in a yttrium europium gallium iron garnet bubble medium having 5 micron bubble domains. A preferred magnitude value in such a system is about 25 oersteds. A preferred magnitude range in europium thulium gallium iron garnet for a 1 micron bubble domain system is 40 to 110 oersteds.

Referring now to the drawings, FIGS. 1A through 1D represent a schematic concept of the theory which is believed to govern this invention. As mentioned earlier, this invention is not limited to this particular theory. However, the experimental evidence obtained so far substantiates such a concept.

In FIG. 1a the magnitude of the in-plane magnetic field, $H_x$, that is applied is 0 oersteds. The S = 1 state is the most stable state. The bubble domain having an S = 1 state will stay in this state regardless of the magnitude of the gradient drive field that is applied. In other words, no matter how fast the wall of the bubble domain is moved, no magnetic orientation instability will convert the state of the S = 1 bubble domain.

The S = 0 state has a finite energy barrier, $E_{B1}$, which when exceeded will convert the state to S = 1. In other words, when a certain gradient drive field is applied, the magnetic orientation of the wall of the S = 0 bubble domain becomes unstable and will change to the S = 1 state.

Figure 1B:
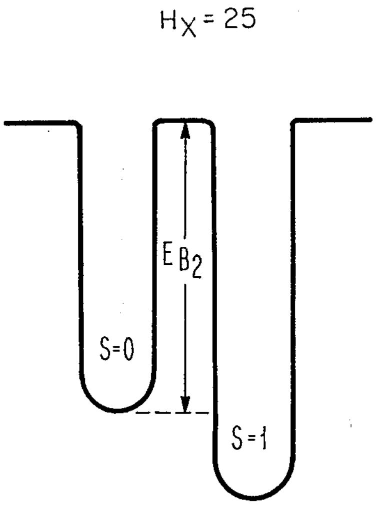

In FIG. 1B, the $H_x$ is 25 oersteds and the energy barrier $E_{B2}$ is substantially larger than the energy barrier, $E_{B1}$, in FIG. 1A. This means the S = 0 state bubble domain is substantially more stable than the one in FIG.

1A. $E_{B2}$ is the maximum energy barrier of FIGS. 1A–1D. Hence the $H_x$ of 25 oersteds is the preferred magnitude of the in-plane magnetic field that is applied.

Figure 1C:
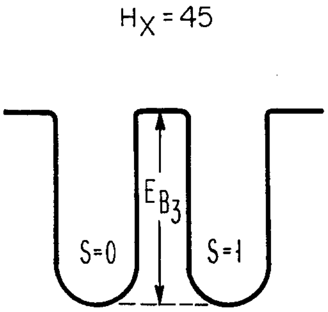

In FIG. 1C the $H_x$ is 45 oersteds and the energy barrier, $E_{B3}$, which when exceeded will convert some of the S = 0 state bubble domains to the S = 1 state and some of the S = 1 state bubble domains to the S = 0 state. $E_{B3}$ is significantly larger than the energy barrier, $E_{B1}$, in FIG. 1A.

Figure 1D:
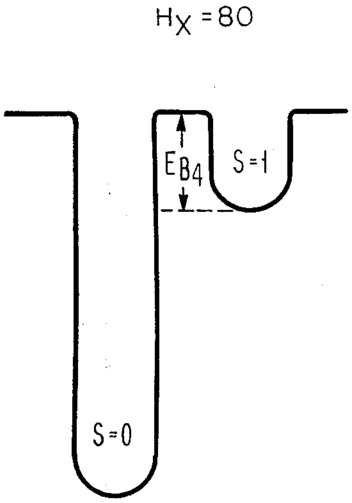

In FIG. 1D, the magnitude of the in-plane magnetic field, $H_x$, that is applied is 80 oersteds. The S = 0 state is the most stable state. The bubble domain having an S = 0 state will stay in this state regardless of the magnitude of the gradient drive field that is applied. In other words, no matter how fast the wall of the bubble domain is moved, no magnetic orientation instability will convert the state of the S = 0 bubble domain.

The S = 1 state has a finite energy barrier, $E_{B4}$, which when exceeded will convert the state to S = 0. In other words, when a certain gradient drive field is applied, the magnetic orientation of the wall of the S = 1 bubble domain becomes unstable and will change to the S = 0 state.

As shown in FIGS. 1A through 1D, the energy barrier is the smallest when $H_x$ is 0 or 80 oersteds. The energy barrier is the largest when $H_x$ is 25 oersteds. It has been observed that when $H_x$ is 25 oersteds, both S = 0 state and S = 1 state bubble domains can be subjected to a larger gradient drive field without converting the S = 1 state bubble to S = 0 state or the S = 0 state bubble to S = 1 state. This phenomena is shown in Examples 1 and 2 described below.

EXAMPLE NO. 1

A bubble domain film of $Y_{2.35}Eu_{0.65}Ga_{1.2}Fe_{3.8}O_{12}$ was deposited on a garnet substrate by standard liquid phase epitaxial techniques. An exchange coupled magnetic layer was then formed by the ion-implantation of the bubble film with a dosage of $3 \times 10^{16}$ protons/cm$^2$ at an energy of 25 Kev.

Bubble domains having an S = 1 and S = 0 state were formed by the method described in the aforementioned co-pending application, Ser. No. 492,565. In-plane fields of 0, 25, 50, 80 and 130 oersteds were then applied to the exchange coupled magnetic layer in a series of separate tests. At each in-plane magnetic field strength the bubble domains were moved with a velocity dependent upon the size of the gradient drive field. The following gradient drive fields were applied across the diameter of the bubble domain: 1 to 2, 3 to 8. 9 to 12, and > 14 oersteds. The following table sets forth the stability data obtained from the tests.

| In-plane Magnetic Field, $H_x$ Oersteds | State, S | State Stability [a] Gradient Drive Field, Oersteds $1<\Delta H<2$ | $3<\Delta H<8$ | $9<\Delta H<12$ | $14<\Delta H$ |
|---|---|---|---|---|---|
| 0 | 1 | Yes | Yes | Yes | Yes |
| | 0 | Yes | Yes | No | No |
| 25 | 1 | Yes | Yes | Yes | Yes |
| | 0 | Yes | Yes | Yes | No |
| 50 | 1 | Yes | Yes | No [b] | No [b] |
| | 0 | Yes | Yes | No [b] | No [b] |
| 80 | 1 | Yes | No | No | No |
| | 0 | Yes | Yes | Yes | Yes |
| 130 | 1 | No | No | No | No |

-continued

| In-plane Magnetic Field, $H_x$ Oersteds | State, S | State Stability [a] Gradient Drive Field, Oersteds 1<ΔH<2 | 3<ΔH<8 | 9<ΔH<12 | 14<ΔH |
|---|---|---|---|---|---|
| | 0 | Yes | Yes | Yes | Yes |

[a] "Yes" means the state is stable with no conversion. "No" means the state is not stable and conversion occurred.
[b] Some conversion occurred.

When no in-plane magnetic field is applied, that is $H_x = 0$, $S = 1$ state bubble domains are stable at all gradient drive fields. The $S = 0$ state bubble domains are stable when moved at velocity with a gradient drive field of less than 8 oersteds. At gradient drive fields of 9 to 12 oersteds and > 14 oersteds, the $S = 0$ state bubble domains were not stable and they were converted to the $S = 1$ state.

The bubble domain system was most stable when an in-plane magnetic field, $H_x$, of 25 oersteds was applied. Bubbles having either an $S = 0$ state or an $S = 1$ state were stable when a gradient drive field up to 12 oersteds was applied.

When an in-plane magnetic field of 50 oersteds was applied and the gradient field drive was 9 to 12 oersteds, some $S = 0$ state bubble domains were converted to the $S = 1$ state and some $S = 1$ state bubble domains were converted to the $S = 0$ state.

When an in-plane magnetic field of 130 oersteds was applied, bubble domains having an $S = 1$ state were converted to the $S = 0$ state as soon as they were moved with a gradient drive field of 1 to 2 oersteds.

EXAMPLE NO. 2

A bubble domain film of $Y_{2.35}Eu_{0.65}Ga_{1.2}Fe_{3.8}O_{12}$ was deposited on a garnet substrate by standard liquid phase epitaxial techniques. An exchange coupled magnetic layer was then formed by depositing a layer of $Y_{2.4}Gd_{0.6}Ga_1Fe_4O_{12}$ having a thickness of 0.2 $\mu$ on the bubble domain film.

Bubble domains having an $S = 1$ and an $S =$ state were formed. In-plane fields of 0, 20, 50, 80 and 130 oersteds were then applied to the exchange coupled layer in a series of separated tests. At each in-plane magnetic field strength, the bubble domains were moved with a velocity dependent upon the magnitude of the gradient drive field. The following gradient drive fields were applied across the diameter of the bubble domain: 1 to 2, 3 to 8, 9 to 12, and > 14 oersteds. The following table sets forth the stability data obtained from the tests.

| In-plane Magnetic Field, $H_x$ Oersteds | Gradient Drive Field, Oersteds State, S | State Stability [a] 1<ΔH<2 | 3<ΔH<8 | 9<ΔH<12 | 14<ΔH |
|---|---|---|---|---|---|
| 0 | 1 | Yes | Yes | Yes | Yes |
| | 0 | No | No | No | No |
| 20 | 1 | Yes | Yes | Yes | Yes |
| | 0 | Yes | Yes | No | No |
| 50 | 1 | Yes | Yes | No [b] | No [b] |
| | 0 | Yes | Yes | No [b] | No [b] |
| 80 | 1 | Yes | No | No | No |
| | 0 | Yes | Yes | Yes | Yes |
| 130 | 1 | No | No | No | No |
| | 0 | Yes | Yes | Yes | Yes |

[a] "Yes" means the state is stable with no conversion. "No" means the state is not stable and conversion occurred.
[b] Some conversion occurred.

The most stable conditions existed in this example when an in-plane magnetic field of 20 oersteds was applied to the exchange coupled magnetic layer.

What is claimed is:

1. A method of stabilizing a bubble domain system having a magnetic layer exchange coupled to a medium containing bubble domains having no Bloch lines and bubble domains having a pair of Bloch lines comprising the steps of continuously applying an in-plane magnetic field to said magnetic layer, said magnetic field having a magnitude greater than 0 oersteds and less than that required to obtain a first bubble domain having a pair of Bloch lines when the wall of said first bubble domain is moved with a velocity sufficient to cause magnetic orientation instability therein.

2. A method as described in claim 1 whereby said applying an in-plane magnetic field step is done by using an external coil.

3. A method as described in claim 1 whereby said applying an in-plane magnetic field step is done by using a permanent magnet.

4. A method as described in claim 1 whereby said magnetic field has a magnitude of 15 to 40 oersteds when the bubble domain diameter is about 5 microns.

5. A method as described in claim 1 whereby said magnetic field has a magnitude of 5 to 25% of the saturation magnetization of said medium.

6. A method as described in claim 1 whereby said magnetic field has a magnitude sufficient to provide about the maximum energy barrier between both of the wall states.

7. A method as described in claim 6 whereby said magnetic field has a magnitude within ± 20% of that sufficient to provide the maximum energy barrier between both of the wall states.

8. A method of stabilizing a bubble domain system containing bubble domains having no Bloch lines and bubble domains having a pair of Bloch lines comprising the steps of exchange coupling a magnetic layer to said bubble domain system, continuously applying an in-plane magnetic field to said magnetic layer, said magnetic field having a magnitude greater than 0 oersteds and less than that required to obtain a first bubble domain having a pair of Bloch lines when the wall of said first bubble domain is moved with a velocity sufficient to cause magnetic orientation instability therein.

9. An apparatus for stabilizing a bubble domain system containing bubble domains having no Bloch lines and bubble domains having a pair of Bloch lines in a medium supporting bubble domains comprising:

a magnetic layer exchange coupled to said medium;

means for applying a constant in-plane magnetic field to the entire magnetic layer; and means for actuating said in-plane field to a magnitude greater than 0 oersteds and less than that required to obtain a first bubble domain having a pair of Bloch lines when the wall of said first bubble domain is moved with a velocity sufficient to cause magnetic orientation instability therein.

* * * * *